(12) United States Patent
Williams

(10) Patent No.: US 6,954,492 B1
(45) Date of Patent: Oct. 11, 2005

(54) METHOD OF DIFFERENTIAL ENCODING A PRECODED MULTIPLE MODULUS ENCODER

(75) Inventor: Richard G. C. Williams, San Diego, CA (US)

(73) Assignee: 3Com Corporation, Marlborough, MA (US)

(*) Notice: Subject to any disclaimer, the term of this patent is extended or adjusted under 35 U.S.C. 154(b) by 0 days.

(21) Appl. No.: 09/551,889

(22) Filed: Apr. 19, 2000

(51) Int. Cl.[7] ............................................. H04B 1/38
(52) U.S. Cl. ..................................................... 375/222
(58) Field of Search .......................... 375/222, 242–245, 375/254, 219, 346, 295, 316, 285, 296; 341/76, 341/77

(56) References Cited

U.S. PATENT DOCUMENTS

| 5,555,547 A | * | 9/1996 | Lemaitre et al. | ............ 375/262 |
| 6,084,883 A | * | 7/2000 | Norrell et al. | ............. 370/420 |
| 6,343,101 B1 | * | 1/2002 | Dong et al. | ................. 375/242 |
| 6,418,170 B1 | * | 7/2002 | Maurer et al. | .............. 375/244 |

FOREIGN PATENT DOCUMENTS

WO    WO 9967890 A1 * 12/1999    ............ H04B 1/38

OTHER PUBLICATIONS

"A Modem Operating At Data Signalling Rates Of Up To 33600 bit/s For Use On The General Switched Telephone Network And On Leased Point-to-Point 2-Wire Telephone-Type Circuits", ITU-T V. 34, Feb. 1998, pp. i-72.
Richard Williams, "A Digital Modem And Analogue Modem Pair For Use On The Public Switched Telephone Network (PSTN) At Data Signalling Rates Of Up To 56000 Bit/s Downstream And Up To 336000 Bit/s Upstream", V.90, May 6, 1998, pp. 1-50.
Richard Williams, "Differential Encoding For V.92 Upstream", ITU Study Group 16, Apr. 25-28, 2000, pp. 1-3.
Dea-Young Kim, "180° Phase Invariance For Recommendation V.92", TIA, Mar. 22, 2000, pp. 1-5.

* cited by examiner

Primary Examiner—Kevin Burd
(74) Attorney, Agent, or Firm—McDonnell Boehnen Hulbert & Berghoff LLP

(57) ABSTRACT

A differential encoder is designed to correct for any phase invariance. Without differential encoding defined for the V.92 upstream, undetectable errors are possible in a modem due to an inversion in the upstream channel. Immunity to channel inversions is provided by differentially encoding a combined preceding and modulus conversion system. A frame of a constellations is attributed a sign and the frame and the sign are differentially encoded. The frame and the sign are differentially decoded after the multiple modulus decoder, ensuring phase shift immunity.

25 Claims, 3 Drawing Sheets

US 6,954,492 B1

METHOD OF DIFFERENTIAL ENCODING A PRECODED MULTIPLE MODULUS ENCODER

TECHNICAL FIELD

This invention relates to differential encoding data bits, and more particularly to ensuring phase shift immunity in modems using such differential encoding.

BACKGROUND

The word MODEM is an acronym for MOdulator-DEModulator. Modems accept digital data typically supplied by the local PC, and convert it to a modulated analog waveform that can be transmitted over a normal analog phone line. Conversely, modems also accept a modulated analog wave from the telephone line, convert it to a digital form, and pass it on to a local computer. During modem communication, it is possible that the channel the modem is communicating over is inverted, causing a negative voltage to be perceived as positive and a positive voltage to be perceived as negative. In a system employing 1-dimensional modulation techniques, such as PAM, this channel inversion is equivalent to a 180 degree phase shift of the constellation used for transmission. Similarly, if a 2-dimensional modulation scheme, such as QAM, is used, the channel inversion can be equivalent to a 90 degree phase shift of the constellation used for transmission. Since the constellations used normally have rotational symmetry, if this situation is not known or corrected for, the modem may process the data erroneously.

The emerging V.92 standard uses PAM modulation upstream by combining multiple modulus conversion with preceding techniques. This leads to a problem with ensuring 180 degree phase shift immunity. Immunity to phase shifts that are otherwise undetectable by a modem have been included in all recent modem standards. All previous schemes have operated on a symbol by symbol basis. For a modem operating under the emerging V.92 standard, attempts to ensure phase invariance have been extremely complex. What is needed is a simple solution to ensuring 180 degree phase shift immunity in modems operating under the V.92 standard.

SUMMARY

The present invention provides a simple solution to ensuring phase invariance in V.92 modems. Immunity to channel inversions is provided by a differential encoding algorithm combined with the precoding and modulus conversion system already defined for a V.92 transmitter. A frame of constellations is attributed a sign and the frame and the sign are differentially encoded. The frame and the sign are differentially decoded after the multiple modulus decoder, ensuring phase shift immunity.

One aspect of the present invention is a method of compensating for phase shifts comprising determining the sign to a frame and differentially encoding the sign of the frame. The method further comprises differentially encoding the frame and receiving the channel output. The sign of the output is determined, and the output is then differentially decoded.

Another aspect of the invention is a method of compensating for a phase shift in a modem comprising attributing a sign to a frame of a constellation and differentially encoding the frame and the sign. After transmission, the frame and the sign are differentially decoded.

DESCRIPTION OF DRAWINGS

These and other features and advantages of the invention will become more apparent upon reading the following detailed description and upon reference to the accompanying drawings.

DETAILED DESCRIPTION

Figure 1:
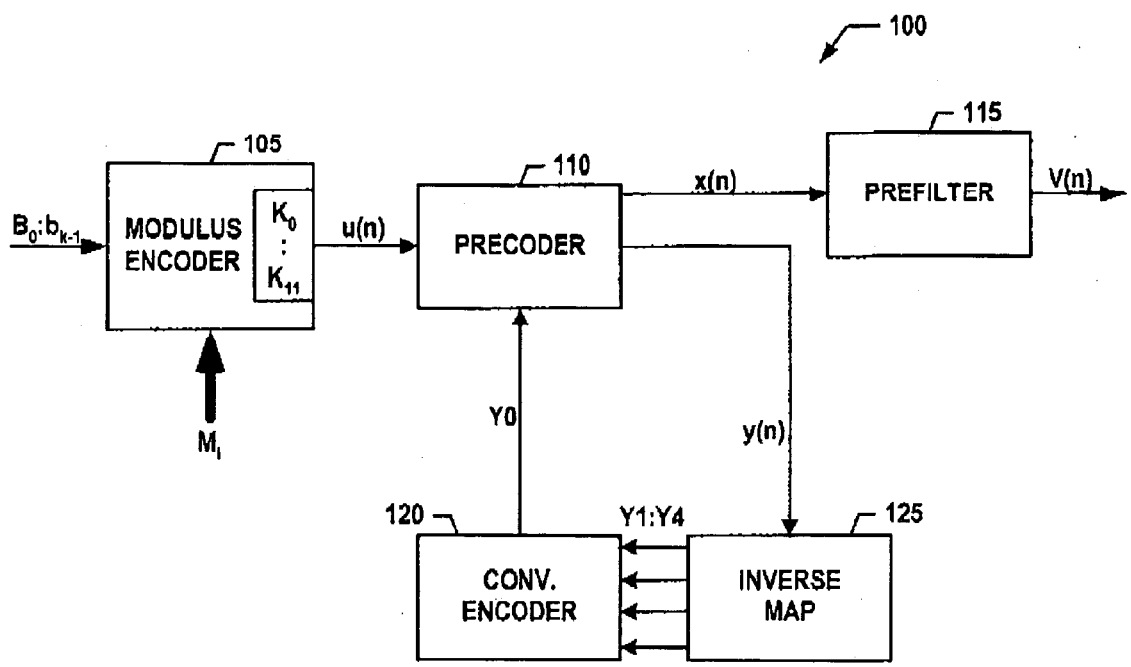
FIG. 1 illustrates a transmitter used according to the V.92 standard in accordance with the present invention.

FIG. 1 illustrated a transmitter 100 used according to the V.92 standard in accordance with the present invention. The transmitter 100 includes a modulus encoder 105, a precoder 110, a prefilter 115, a convolutional encoder 120, and an inverse map 125. The modulus encoder 105 is a standard multiple modulus encoder. The modulus encoder 105 receives and encodes a block of bits $b_0:b_{k-1}$. The block of bits $b_0:b_{k-1}$ is represented as an integer $R_0$. The output signal is a set of numbers $K_0:K_{11}$ derived from $R_0$ as the multiple modulus representation of $R_0$. This output is then mapped into equivalence classes u(n) in order to minimize the power coming out of the precoder. The equivalence classes u(n) are related to each other in a simple manner as in classical Tomlinson precoding. Thus, the expanded constellations have points labeled in blocks from 0 to $M_{i-1}$, where $M_i$ is the modulus for the ith constellation.

The precoder 110 receives the output signal and after precoding provides the signals x(n) and y(n). The signal x(n) is provided to the prefilter 115. The signal y(n) is provided to the inverse map 125. Therefore, a technique to correct for the phase shift is required. The inverse map 125 provides the mapped outputs of Y1:Y4 to the convolutional encoder 120. The convolutional encoder 120 then provides the signal Y0 to the precoder 110 in a feedback loop. If the channel voltage of the transmitter 100 is inverted, the signal v(n) becomes −v(n). This causes the input to the modulus decoder to be $M_i-1-K_i$ instead of $K_i$.

The modulus encoder 105 takes in K bits as an integer $R_0$ which is converted into 12 digits $K_i$. As stated above, due to the equivalence class mapping, a symbol $R_0$ passing through the modulus encoder 105, precoder 110, prefilter 115, convolutional encoder 120, inverted channel and convolutional decoder will emerge as $N-1-R_0$. This will cause errors in the output of the modulus decoder and these errors are undetectable by the modem.

To correct for the phase shift, the present invention includes a simple sign differential encoder. Differentially encoding the K bits at the input of the modulus encoder 105 provides the following:

Differential encoder $D(n)=[R_0+D(n-1)]_{modN}$;
Differential decoder $[D(n)-D(n-1)]_{modN}=R_0$;
Differential encoder $D(n)=[R_0+D(n-1)]_{modN}$;
Channel adds a phase shift $D'(n)=N-1-D(n)$;
Differential decoder $[D'(n)-D'(n-1)]_{modN}=N-R_0$.

where $R_0$ is the frame value and N is the product of the moduli. As shown by the above equations, without a channel inversion, $R_0$ is returned. However, with a channel inversion, $N-R_0$ is returned. To correct for the channel inversion, a sign differential encoder may be used outside this operation. For example, a sign s(n) of 1 can be attributed to any frame whose value is >N/2 and a sign s(n) of 0 can be attributed to all others. After assigning a sign s(n), the sign s(n) may be differentially encoded as d(n)=s(n)⊕(d(n−1), where ⊕ is modulo 2 addition. The differentially encoded sign is applied to the frame's value and this is entered into the differential encoder described above. By differentially encoding the sign s(n), the input and output of the transmitter 100 are now invariant to 180 degree phase shifts. One way to achieve the differential encoding of the multiple modulus converted frames is to differentially encode the input. Thus, $D(n)=R_0+D(n-1)$ can be performed on the input $b_0$ to $b_{K-1}$ as a modulo N addition before the multiple modulus encoder. Similarly, the differential decoding is carried out after the multiple modulus decoder.

Figure 2A:
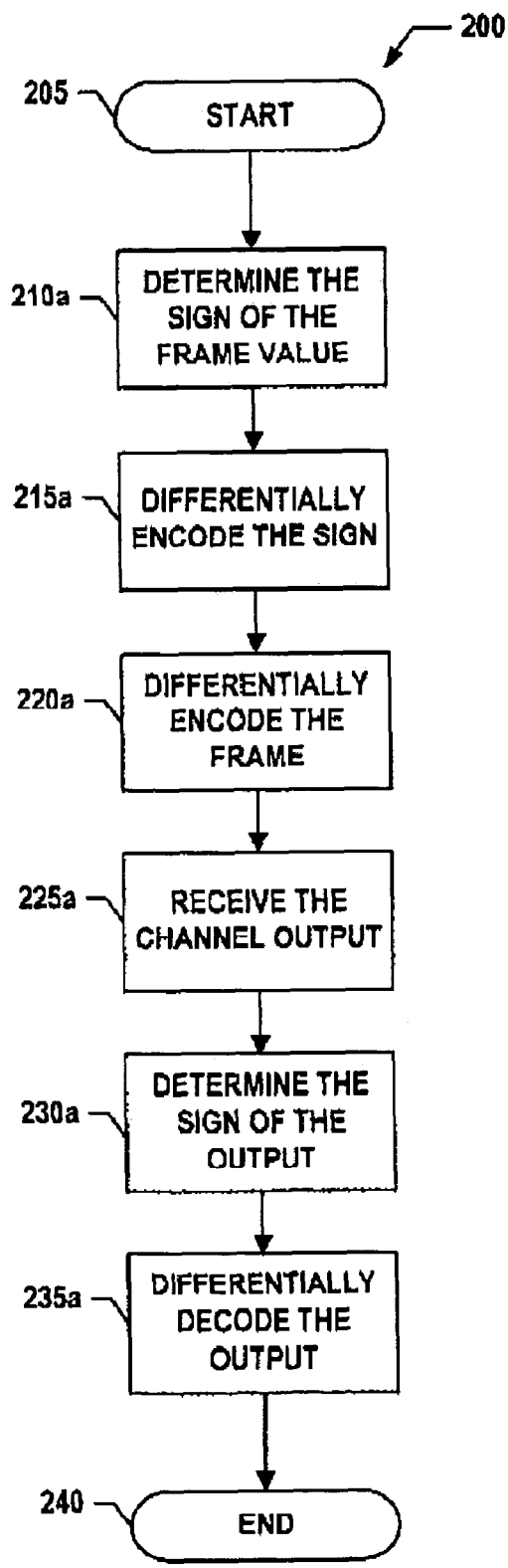
FIG. 2 is a flowchart showing the differential encoding process according to the present invention.

The process 200 of correcting for a phase shift is shown in FIG. 2A. The process begins at a start state-205. Proceeding to state 210a, the process 200a determines the sign of the frame value. One technique to determine the sign of the frame is using the following formula:

$$s(n)=0 \text{ if } R_0<=N/2, s(n)=1 \text{ if } R_0>N/2.$$

After determining the sign, the process 200 proceeds to state 215a. In state 215a, the process 200 differentially encodes the sign of the frame. The sign may be differentially encoded using the formula:

$$d(n)=[s(n)+d(n-1)]_{mod2}.$$

The process 200 then proceeds to state 220a. In state 220a, the process 200 differentially encodes the frame. The frame may be differentially encoded using techniques known to one of skill in the art. For example, the frame may be differentially encoded using the formula:

$$D(n)=[D(n-1)+N+(-1)^{d(n-1)}R_0]_{modN}.$$

Proceeding to state 225, the process 200 receives the channel output. Based on the above formulas, the channel output is defined by:

$$R(n)=[D(n)+N-D(n-1]_{modN}.$$

Proceeding to state 230a, the process 200 determines the sign of the output. The sign of the output is 0 if the channel output is equal to or less than half the product of the moduli and 1 if the channel output is more than half the product of the moduli. This relationship can be stated as follows:

$$r(n)=0 \text{ if } R(n)<=N/2,$$

$$r(n)=1 \text{ if } R(n)>N/2.$$

Proceeding to state 235a, the process 200 differentially decodes the output. The output may be differentially decoded using the following formula:

$$R_0=[N+(-1)^{r(n-1)}R(n)]_{modN}.$$

After the output is differentially decoded, the process 200 is invariant to 180 degree phase shifts. Thus, the process 200 concludes in end state 240.

Figure 2B:
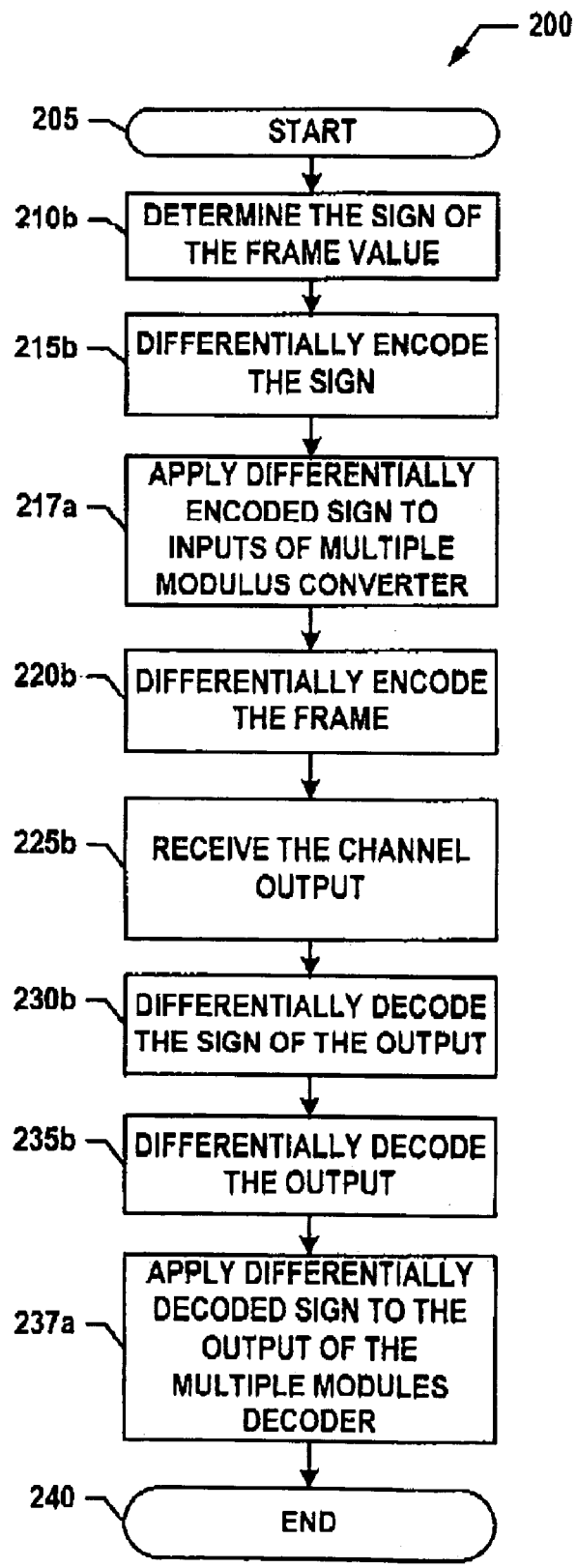

Referring now to FIG. 2B, an example of the process 200 will now be provided. The example is for a 3 symbol multiple modulus encoder with moduli of 7, 3 and 10. The product of these moduli is 210, so 7 bits can be mapped in each frame. Let the inputs, in decimal, be 86, 45, 112; and 103.

First, the sign stream is determined according to state 210b. One-half the product of the moduli is (210/2), or 105. Thus, the inputs less than or equal to 105 are given a sign of 0 and those greater than 105 are given a sign of 1. This creates an original sign stream is 0, 0, 1, 0.

After determining the original sign stream, the sign stream is differentially encoded according to state 215b. The differentially encoded sign stream is 0, 0, 1, 1. Applying this to the inputs we get new inputs to the modulus converter of 86, 45, 112, 107 (−103+210) as shown in state 217b. As shown in state 220b, this new input is then differentially encoded, resulting in a differentially encoded stream is of 86, 131, 33 (131+112−210), 140. This stream translates into symbols of {2, 2, 6}, {4, 1, 1}, {1, 0, 3}, {4, 2, 0}.

If the channel does not have phase inversion, the symbols 86, 131, 33, 140 arrive which are differentially decoded into 86, 45, 112, 107, as shown in state 225b. The sign pattern 0, 0, 1, 1 is differentially decoded into 0, 0, 1, 0, as shown in state 230b. As shown in states 235b, 237b, the differentially decoded sign pattern is then applied to the outputs of the multiple modulus decoder differential decoder, resulting in the correct final stream of 86, 45, 112, 103 (−107+210).

If the channel is subject to phase inversion, the symbols arrive as {4 (7−1−2), 0, (3−1−2), 3 (10−1−6}, {2,1,8}, {5, 2, 6}, {2, 0, 9} as also shown in state 225b. These symbols decode to 123, 78, 176, 69. These symbols are differentially decoded to produce 124 (123−209 (an inverter 0)+210), 165 (78−123+210), 98, 103 as shown in state 235b. The sign pattern of the decoded symbols is 1, 1, 0, 0, which differentially decodes to 0, 0, 1, 0. Applying this to the multiple modulus decoder differential decoder gives the values 86 (−124+210), 45, 112, 103, as shown in state 237b.

Numerous variations and modifications of the invention will become readily apparent to those skilled in the art. Accordingly, the invention may be embodied in other specific forms without departing from its spirit or essential characteristics.

What is claimed is:

1. A method of compensating for channel inversions comprising:
   determining a sign of a frame, wherein the frame has an associated modulus, N;
   differentially encoding the sign of the frame;
   differentially encoding the frame by selectively inverting the frame in response to the differentially encoded sign of the frame, adding the selectively inverted frame to a prior encoded frame, and performing a modulo N reduction; and,
   transmitting a channel output having the differentially encoded frame,
   wherein the sign of the frame is set to zero if $R_0<N/2$ and the sign of the frame is set to one if $R_0>N/2$, and the sign of the frame is set to either one or zero if $R_0=N/2$, where $R_0$ is a value of the frame and N is a product of a plurality of moduli used to form the channel output.

2. The method of claim 1, wherein the sign of the frame is differentially encoded using the equation:

$$d(n)=[s(n)+d(n-1)]_{mod2}.$$

3. The method of claim 1, wherein the value of the frame is differentially encoded using the equation:

$$D(n)=[D(n-1)+N+(-1)^{d(n-1)}R_0]_{modN}.$$

4. The method of claim 1, wherein the output is differentially decoded using the equation:

$$R_0=[N+(-1)^{r(n-1)}R(n)]_{modN}.$$

5. The method of claim 1, further comprising translating the differentially encoded frame into symbols.

6. The method of claim 1, wherein the sign of the frame and the value of the frame are differentially decoded.

7. The method of claim 1, wherein the differential decoding is performed after being supplied to a multiple modulus decoder.

8. The method of claim 1, the frame is differentially encoded before being supplied to a multiple modulus encoder.

9. A method of compensating for a phase shift in a modem comprising:
   attributing a sign to a frame of constellation points, where the frame has an associated modulus, N;
   differentially encoding the frame by selectively inverting the frame in response to a differentially encoded sign of the frame, adding the selectively inverted frame to a prior encoded frame, and performing a modulo N reduction; and
   differentially decoding the frame by (i) selectively inverting the differentially encoded frame (ii) adding the selectively inverted frame to the modulus N, and (iii) performing a modulo N reduction;
   wherein the sign of the frame is set to zero if $R_0<N/2$ and the sign of the frame is set to one if $R_0>N/2$, and the sign of the frame is set to either one or zero if $R_0=N/2$, where $R_0$ is a value of the frame and N is a product of a plurality of moduli used to form the channel output.

10. The method of claim 9, wherein the differential decoding is performed after being supplied to a multiple modulus decoder.

11. The method of claim 9, the frame is differentially encoded before being supplied to a multiple modulus encoder.

12. A method of using differential encoding for a communication, the method comprising:
    determining a sign of a frame;
    differentially encoding the sign of the frame;
    applying the differentially encoded sign to the frame so as to produce a first encoded frame;
    differentially encoding the first encoded frame so as to produce a second encoded frame; and
    transmitting a channel output comprising the second encoded frame.

13. The method of claim 12, wherein the sign of the frame is set to zero if $R_0<=N/2$ and the sign of the frame is set to one if $R_0>N/2$, where $R_0$ is a value of the frame and N is a product of a plurality of moduli used for transmitting the channel output.

14. The method of claim 12, wherein the sign of the frame is set to zero if $R_0<N/2$ and the sign of the frame is set to one if $R_0=>N/2$, where $R_0$ is a value of the frame and N is a product of a plurality of moduli used for transmitting the channel output.

15. The method of claim 12, wherein the sign of the frame is differentially encoded using the equation:

$$d(n)=[s(n)+d(n-1)]_{mod2}.$$

16. The method of claim 12, wherein the value of the frame is differentially encoded using the equation:

$$D(n)=[D(n-1)+N+(-1)^{d(n-1)}R_0]_{modN}.$$

17. The method of claim 12, wherein the output is differentially decoded using the equation:

$$R_0=[N+(-1)^{r(n-1)}R(n)]_{modN}.$$

18. The method of claim 12, further comprising translating the differentially encoded frame into symbols using a plurality of moduli.

19. A method of using differential encoding for a communication, the method comprising:
    receiving a channel output comprising a first encoded frame, wherein the first encoded frame comprises a differentially encoded second-encoded frame, and wherein the second-encoded frame comprises a differentially encoded sign of a frame applied to such frame;
    differentially decoding a sign of the channel output to obtain a decoded sign sequence; and
    differentially decoding the channel output so as to obtain a differentially decoded frame containing possible sign inversions; and,
    applying the decoded sign sequence to the differentially decoded frame to eliminate the possible inversions and to thereby obtain the frame.

20. The method of claim 19, wherein the sign of the frame is set to zero if $R_0<=N/2$ and the sign of the frame is set to one if $R_0>N/2$, where $R_0$ is a value of the frame and N is the a product of a plurality of moduli used for generation of the channel output.

21. The method of claim 19, wherein the sign of the frame is set to zero if $R_0<N/2$ and the sign of the frame is set to one if $R_0=>N/2$, where $R_0$ is a value of the frame and N is a product of a plurality of moduli used for generation of the channel output.

22. The method of claim 19, wherein the sign of the frame is differentially encoded using the equation:

$$d(n)=[s(n)+d(n-1)]_{mod2}.$$

23. The method of claim 19, wherein the value of the frame is differentially encoded using the equation:

$$D(n)=[D(n-1)+N+(-1)^d(n-1)R_0]_{modN}.$$

24. The method of claim 19, wherein the output is differentially decoded using the equation:

$$R_0=[N+(-1)^{r(n-1)}R(n)]_{modN}.$$

25. The method of claim 19, further comprising translating the differentially encoded frame into symbols.

* * * * *